United States Patent Office 3,384,461
Patented May 21, 1968

3,384,461
PROCESS FOR PREPARING THIOTRITHIAZYL HALIDES
Margot Becke, Heidelberg, Germany, assignor to Olin Mathieson Chemical Corporation, a corporation of Virginia
No Drawing. Filed Feb. 5, 1964, Ser. No. 342,772
Claims priority, application Germany, Oct. 25, 1963, B 74,014
9 Claims. (Cl. 23—357)

ABSTRACT OF THE DISCLOSURE

Process for the preparation of thiotrithiazyl halides having the formula $S_4N_3Y$ by passing ammonia gas into a sulfur halide in a diluent inert to sulfur halides, discontinuing the introduction of ammonia when the color of the reaction mixture is gray-green to black and thiotrithiazyl halide has precipitated and separating said thiotrithiazyl halide from said reaction mixture.

This invention relates to a novel process for the preparation of thiotrithiazyl compounds.

Thiotrithiazyl compounds, also knwon as thiotrithiazyl sulfonium salts, have long been known. They have the general formula $S_4N_3X$ in which X is an anionic residue, for example, a nitrate ion. The most readily obtainable compound of this class is thiotrithiazyl chloride, $S_4N_3Cl$, prepared by Demarcay, Compt. rend. 91, 854 (1880), from sulfur nitride, $S_4N_4$ and disulfur dichloride $S_2Cl_2$. The reaction mechanism has been investigated by others, for example, M. Goehring, "Ergebnisse and Probleme der Chemie der Schwefel-Stickstoff-Verbindungen," Berlin, 1957 (Akademieverlag), pages 72 and following. The reaction proceeds according to the equation:

$$2S_2Cl_2 + 3S_4N_4 \rightarrow 4S_4N_3Cl$$

$S_4N_3Cl$ is also obtained from $S_4N_4$ by treatment with hydrogen chloride in the presence of a trace of moisture. $S_4N_3Cl$ also results by the reaction of $S_4N_4$ with thionyl chloride or acetyl chloride. Finally, $S_4N_3Cl$ can be obtained by treating trithiazyl chloride $(NSCl)_3$ with $S_2Cl_2$.

These methods of formation are examples of the general process in which sulfur nitride $S_4N_4$ is first prepared and then treated with disulfur dichloride or any other of the abovementioned reagents or is first chlorinated to thiotrithiazyl chloride and then reacted with disulfur dichloride.

Processes for the preparation of sulfur nitride $S_4N_4$ are known. It results from the reaction of disulfur dichloride with ammonia. The yield of $S_4N_4$ is poor since the reaction always proceeds with the formation of sulfur, other sulfur nitrides and sulfur imides. Furthermore, work with large quantities of $S_4N_4$ is dangerous since the compound can explode under impact or by heating. Since thiotrithiazyl compounds, particularly thiotrithiazyl chloride and bromide are suitable starting materials for the preparation of other sulfur-nitrogen compounds, it is desirable to provide a convenient and safe method for the technical preparation of these compounds.

In contrast to sulfur nitride, the thiotrithiazyl halides, for example, the chloride are safe to handle. In addition to their suitability as intermediates, they may also be used as fungicides. The halogen anion of these compounds can easily be replaced by double decomposition with other anionic residues, for example, the nitrate ion or the hydroxyl ion. These compounds are also useful as pesticides which act simultaneously as fertilizers.

The process of the invention comprises the preparation of thiotrithiazyl halides of the formula $S_4N_3Y$ in which Y is a chloride or bromide ion by the reaction of ammonia with sulfur halides of the general formula $S_nY_m$ in which Y is chlorine or bromine atom, $n$ has a value of 1 to 3 and $m$ has a value of 2 to 4. Suitable sulfur halides include $S_2Y_2$, $SY_2$ and $SY_4$.

Examples are disulfur dichloride, disulfur dibromide, sulfur dichloride, sulfur tetrachloride and products whose compositions lie between $S_3Cl_3$ and $SCl_4$. Particularly useful are disulfur dichloride and disulfur dibromide. The resulting thiotrithiazyl halides can be converted by known methods of double decomposition in formic acid into other salts, for example, the nitrate.

In carrying out the process of the invention the sulfur halide is dissolved in a solvent or diluent inert to sulfur halides and ammonia is introduced. The reaction temperature suitably is between 10 and 100° C., particularly between 30 and 70° C. The reaction proceeds exothermically on the introduction of ammonia into the solution. The reaction temperature is controlled by regulating the flow of ammonia or by external cooling.

Lower halocarbons are especially suitable as inert diluents including carbon tetrachloride, chloroform, trichloroethylene and tetrachloroethylene but lower alkanes including hexane and petroleum ether are also suitable. From about 5 to about 15 parts by volume of the diluent per volume of the sulfur halide is suitable.

Reaction of ammonia with the sulfur halide results in a precipitate which at first is white and then becomes strongly colored. Finally one obtains a thick ochre-colored slurry. On passing further amounts of ammonia into the slurry, it becomes a dark gray-green, almost black and then lightens until finally it is a salmon-red color. From the salmon-red precipitate, sulfur nitride can be obtained by known methods.

If the ammonia addition is interrupted when the reaction mixture is grey-green to black and the resulting precipitate is separated from ammonium chloride or bromide and sulfur, the desired thiotrithiazyl halide is obtained.

The reaction product can be worked up in various ways in order to separate the by-products. In one suitable procedure, the reaction product is dried and dissolved by extraction with anhydrous formic acid and then, by addition of ether to the formic acid extract, the thiotrithiazyl chloride is separated from the by-product ammonium chloride or bromide. The thiotrithiazyl compound precipitates first as a difficultly soluble compound and is separated by fractional precipitation from ammonium salts.

In another suitable procedure, the dried reaction product is washed briefly and quickly with ice-cold water whereby the ammonium salts dissolve. It is important in this method to work quickly to avoid hydrolyzing the thiotrithiazyl halide. The remaining residue is washed with anhydrous alcohol then with ether and dissolved in 98 to 100% formic acid. The thiotrithiazyl halide is precipitated by the addition of ether to the formic acid solution.

Compounds of the general formula $S_4N_3X$ in which X is an anionic residue can be prepared from the thiotrithiazyl halide by double decomposition in formic acid as solvent. One process for the preparation of such derivatives has been described by M. Becke-Goehring and H. P. Latscha, Z. Naturforschg. 17b, 125 (1962). Furthermore, sulfur nitride $S_4N_4$ can be prepared by the use of ammonia in excess on the thiotrithiazyl halides.

By careful hydrolysis of the thiotrithiazyl halides, thiotrithiazyl hydroxide $S_4N_3OH$ can be prepared. By treatment with thionyl chloride or bromide, in contrast to the literature (Z. anorg. allgem. Chem. 271, 281 (1953)) thiotrithiazyl hydroxide can be easily and quantitatively converted back into the thiotrithiazyl chloride or bromide. In this way it is possible to purify by crude thiotrithiazyl halides by means of the hydroxide.

Example I

In a 4-neck flask fitted with a gas inlet tube reaching to the bottom of the flask, stirrer, long-stem thermometer and reflux condenser carrying a KOH drying tube, was introduced disulfur dichloride and about 10 to 15 times its volume of carbon tetrachloride.

An ammonia cylinder was connected to a flow meter or bubble counter, a pressure relief valve and a drying tube filled with flake potassium hydroxide and to the gas inlet tube. At the upper end of the gas inlet tube, a T-tube is provided in order to permit cleaning the gas inlet tube by means of a wire.

The carbon tetrachloride solution is vigorously stirred, warmed to about 30° C. and ammonia is introduced. A strongly exothermic reaction begins and small quantities of a white precipitate of ammonium chloride appear in the red-brown solution. The temperature of the mixture rises and is held between 50 and 55° C. by cooling.

As the reaction proceeds the precipitate becomes thick and mixed with brownish-yellow flakes and finally a thick ochre to yellow slurry is formed.

With the first appearance of a black color in the slurry, the ammonia introduction is interrupted, the precipitate is filtered and washed with carbon tetrachloride and finally with dry ether.

In order to purify the crude product, it is digested with substantially anhydrous, 98 to 100% formic acid whereby all but small quantities of plastic sulfur dissolve. The solution is filtered and, by careful addition of dry ethyl ether to the formic acid solution, a partial precipitation takes place. $S_4N_3Cl$ first precipitates and then ammonium chloride by further addition of ether.

By repeating the precipitation several times pure light-yellow $S_4N_3Cl$ is obtained. It has no melting point. The compound explodes on heating with a blue light and formation of red fumes.

Analysis for $S_4N_3Cl$ (205.7). Calc: S, 62.35%; N, 20.43%; Cl, 17.23%. Found: S, 62.42%; N, 20.38%; Cl, 17.33%.

Another method for the separation of the by-products formed in the reaction is by drying the crude reaction product to a dust and shaking briefly with ice-water (0 to 5° C.). Most of the ammonium chloride and a small amount of $S_4N_3Cl$ dissolves. Most of the $S_4N_3Cl$ remains undissolved, colored green as a result of a slight amount of hydrolysis. The green residue is quickly filtered, washed with anhydrous alcohol and ether and precipitated from formic acid. An analytically pure product is thus obtained.

This method has the principal advantage that a pure product is obtained quickly with minimum loss. The proportion of loss depends on the particle size of the $S_4N_3Cl$ and the length of time that the substance is in contact with water.

When the thiotrithiazyl chloride is not the desired product the $S_4N_3$ cation can be precipitated from the formic acid solution by double decomposition as $S_4N_3Br$ or in the form of other solvents.

By the addition of 20 ml. (32.7 g.) of disulfur dichloride, a reaction time of 20 to 30 minutes and a stream of ammonia averaging 1.7 g./min., a yield of 11 g. of $S_4N_3Cl$ was obtained corresponding to 45% conversion of the sulfur to the $S_4N_3Cl$.

Example II

Following the procedure of Example I, sulfur dichloride was reacted with ammonia. The reaction proceeded as in the case of $S_2Cl_2$ with ammonia but the time of reaction for equivalent amounts of ammonia is 2 to 3 times as long. The working up of the reaction product is as described in Example I to obtain $S_4N_3Cl$.

Example III

By the reaction of 20 ml. (52 g.) of disulfur dibromide with ammonia following the procedure of Example I, a yield of 7 g. of orange-yellow crystals of $S_4N_3Br$ was obtained, which is 35% conversion of the sulfur into $S_4N_3Br$.

Analysis for $S_4N_3Br$ (250.2). Calc: N, 51.27%; S, 16.80%; Br, 31.94%. Found: N, 51.37%; S, 16.71%; Br, 31.82%.

Example IV

Thiotrithiazyl hydroxide was prepared as described by A. Meuwsen and O. Jakob, Z. anorg. allgem. Chem. 263, 200 (1950) by shaking thiotrithiazyl chloride with ice-cold aqueous sodium acetate solution. 5.6 g. of thiotrithiazyl hydroxide was suspended in 300 ml. of anhydrous carbon tetrachloride and treated with 30 g. of thionyl chloride which had been freshly distilled from linseed oil. The mixture was refluxed for one hour. First the black base dissolved forming a deep red color. After a few minutes some yellow crystals precipitated. On cooling the solution, the thiotrithiazyl chloride was filtered, washed with carbon tetrachloride and ether and dried. Yield about 6 g. or 96% of theory. The product can be purified as described in Example I by repeated precipitation from solution in anhydrous formic acid.

What is claimed is:

1. Process for the preparation of thiotrithiazyl halides having the formula $S_4N_3Y$ in which Y is selected from the group consisting of chlorine and bromine, by passing ammonia gas at a temperature between 10 and 100° C. into a sulfur halide having the formula $S_nY_m$ in which Y is selected from the group consisting of chlorine and bromine, $n$ is an integer from 1 to 3 and $m$ is an integer from 2 to 4, in a diluent inert to sulfur halides, selected from the group consisting of lower halocarbons and lower alkanes, discontinuing the introduction of ammonia when the color of the reaction mixture is gray-green to black and thiotrithiazyl halide has precipitated and separating said thiotrithiazyl halide from said reaction mixture.

2. Process according to claim 1 in which the precipitated thiotrithiazyl halide is dried, contacted with ice-water and again dried.

3. Process according to claim 1 in which the sulfur halide is disulfur dichloride.

4. Process according to claim 1 in which the sulfur halide is disulfur dibromide.

5. Process according to claim 1 in which the sulfur halide is sulfur dichloride.

6. Process for the preparation of thiotrithiazyl halides having the formula $S_4N_3Y$ in which Y is selected from the group consisting of chlorine and bromine, by passing ammonia gas at a temperature between 10 and 100° C. into a sulfur halide having the formula $S_nY_m$ in which Y is selected from the group consisting of chlorine and bromine, $n$ is an integer of from 1 to 3 and $m$ is an integer from 2 to 4, in a diluent selected from the group consisting of lower halocarbons and lower alkanes, discontinuing the introduction of ammonia when the color of the reaction mixture is gray-green to black and thiotrithiazyl halide has precipitated, separating said thiotrithiazyl halide from said reaction mixture, drying said thiotrithiazyl halide, dissolving in substantially anhydrous formic acid, precipitating by addition of ethyl ether, separating from said formic acid and drying to recover said thiotrithiazyl halide.

7. Process according to claim 6 in which the sulfur halide is disulfur dichloride.

8. Process according to claim 6 in which the sulfur halide is disulfur dibromide.

9. Process according to claim 6 in which the sulfur halide is sulfur dichloride.

References Cited

UNITED STATES PATENTS 2,382,845   8/1945   Arnold et al. -------- 23—191

OTHER REFERENCES

Arnold et al.: "Journal of The Chemical Society," pp. 1645–1649 (1936).

Van Valkenburgh et al.: "Journal of The American Chemical Society," vol. 47, pp. 2134–2137 (1925).

MILTON WEISSMAN, *Primary Examiner.*